(12) United States Patent
Lee

(10) Patent No.: US 11,526,470 B2
(45) Date of Patent: Dec. 13, 2022

(54) DATA VALIDATION FOR DATA RECORD MIGRATIONS

(71) Applicant: salesforce.com, inc., San Francisco, CA (US)

(72) Inventor: Kwun Hung Lee, Newark, CA (US)

(73) Assignee: Salesforce, Inc., San Francisco, CA (US)

( * ) Notice: Subject to any disclaimer, the term of this patent is extended or adjusted under 35 U.S.C. 154(b) by 314 days.

(21) Appl. No.: 15/861,457

(22) Filed: Jan. 3, 2018

(65) Prior Publication Data

US 2019/0205429 A1    Jul. 4, 2019

(51) Int. Cl.
*G06F 16/182* (2019.01)
*G06F 16/11* (2019.01)
*G06F 16/176* (2019.01)
*G06F 16/21* (2019.01)

(52) U.S. Cl.
CPC ........ *G06F 16/1844* (2019.01); *G06F 16/119* (2019.01); *G06F 16/128* (2019.01); *G06F 16/176* (2019.01); *G06F 16/214* (2019.01)

(58) Field of Classification Search
CPC .. G06F 16/1844; G06F 16/119; G06F 16/176; G06F 16/214; G06F 16/128
See application file for complete search history.

(56) References Cited

U.S. PATENT DOCUMENTS

| | | | | |
|---|---|---|---|---|
| 9,043,278 B1* | 5/2015 | Wilson | ..................... | G06F 16/27 707/626 |
| 9,792,321 B2* | 10/2017 | Buehne | ................. | G06F 16/119 |
| 9,804,957 B1* | 10/2017 | Chopra | ............... | G06F 11/3692 |
| 9,996,562 B2* | 6/2018 | Higginson | ............ | G06F 16/214 |
| 2007/0255950 A1* | 11/2007 | Asanuma | ................ | H04L 63/12 713/168 |
| 2009/0132461 A1* | 5/2009 | Garg | ..................... | H04L 9/3247 706/54 |
| 2011/0158405 A1* | 6/2011 | Choi | ..................... | H04L 9/0838 380/44 |
| 2011/0249816 A1* | 10/2011 | Choi | ..................... | H04L 63/065 380/279 |
| 2013/0275708 A1* | 10/2013 | Doi | ....................... | G06F 9/4856 711/165 |
| 2014/0025638 A1* | 1/2014 | Hu | ...................... | G06F 11/1464 707/654 |

(Continued)

*Primary Examiner* — Ashish Thomas
*Assistant Examiner* — Abdullah A Daud
(74) *Attorney, Agent, or Firm* — Holland & Hart LLP

(57) ABSTRACT

Methods, systems, and devices for data validation are described. A user may store a set of data records on a source database and backup the set of data records at a target database through a data migration. A migration and validation server may initiate the data migration. After the data migration is complete, the migration and validation server may perform a validation process that includes comparing a calculated hash value from the source database and the target database that is based on unique identifiers and timestamps for each data record in the set of data records migrated from the source database to the target database. The migration and validation server may determine if the data migration was successful (e.g., the data was transferred correctly) if the hash value calculated for the data records at the target database equals the hash value calculated for the data records at the source database.

14 Claims, 12 Drawing Sheets

(56) References Cited

U.S. PATENT DOCUMENTS

| | | | |
|---|---|---|---|
| 2015/0019487 A1* | 1/2015 | Buehne | G06F 16/119 |
| | | | 707/632 |
| 2016/0070740 A1* | 3/2016 | Vermeulen | G06F 16/2322 |
| | | | 707/703 |
| 2017/0270153 A1* | 9/2017 | Bantupalli | G06F 16/2365 |
| 2017/0270175 A1* | 9/2017 | Bantupalli | G06F 16/273 |
| 2017/0351702 A1* | 12/2017 | Schaefer | G06F 16/27 |
| 2017/0353564 A1* | 12/2017 | Zhou | H04L 67/10 |
| 2018/0260467 A1* | 9/2018 | Stewart | G06F 16/27 |
| 2018/0268019 A1* | 9/2018 | Rostagni | G06F 16/2365 |
| 2018/0336258 A1* | 11/2018 | Lee | G06F 11/36 |
| 2019/0205050 A1* | 7/2019 | Koorapati | G06F 16/148 |

\* cited by examiner

DATA VALIDATION FOR DATA RECORD MIGRATIONS

FIELD OF TECHNOLOGY

The present disclosure relates generally to database systems and data processing, and more specifically to data validation for data record migrations.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, a user may store a set of data records on a source database, server, or similar data storage system. There may be a need to migrate the set of data records or a subset of the data records to a target database for capacity balancing, compliance, adopting a new system of record, data backup, or any other business purposes. In order to determine that the data has been migrated successfully, a data validation process may be performed on the data at the target database compared with the data at the source database. The data validation process may include a row-by-row comparison of data between the data at the target database and the data at the source database. Such techniques incur significant signaling overhead, computational resources, customer downtime, and time.

DETAILED DESCRIPTION

Figure 1:
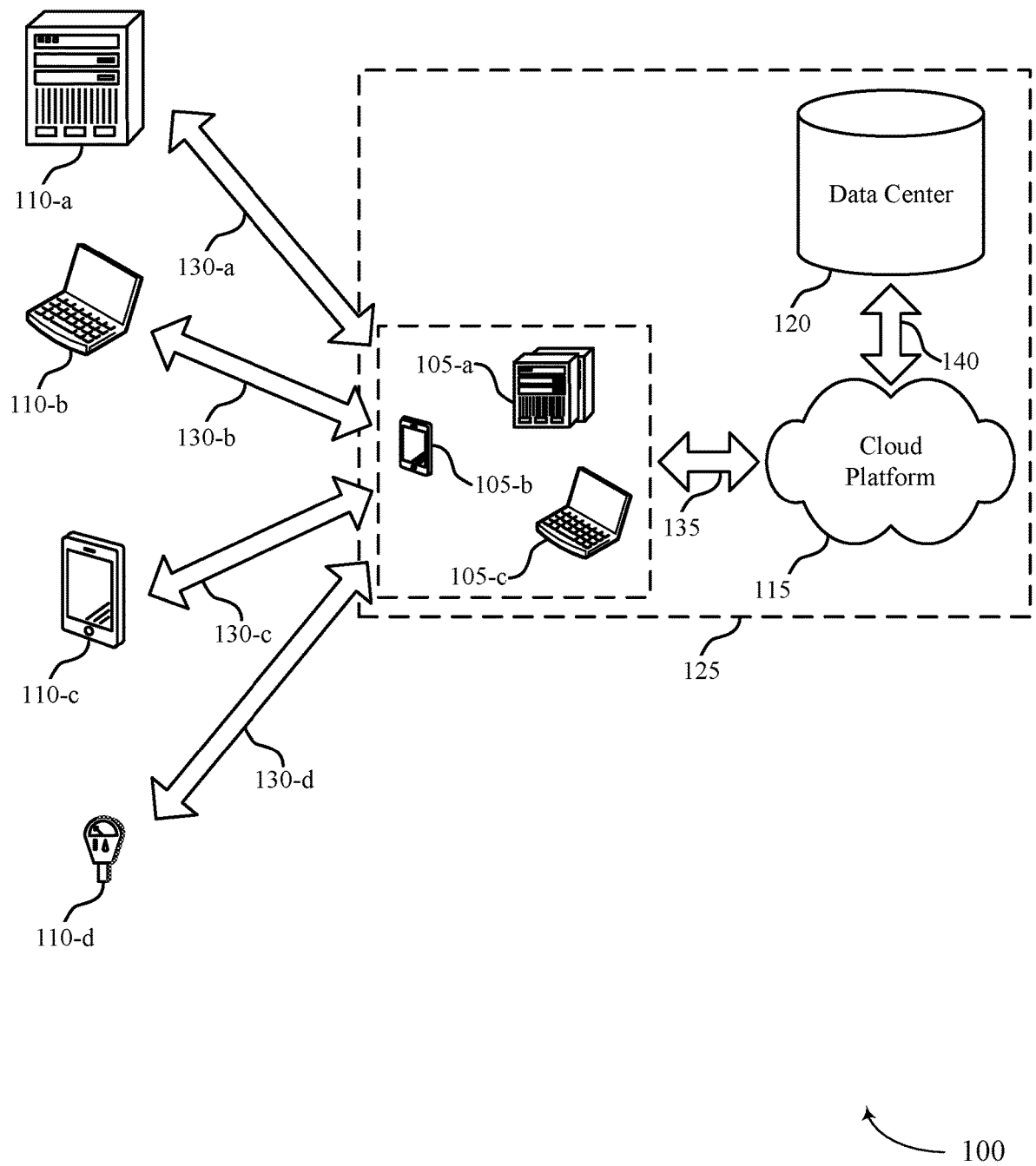
FIG. 1 illustrates an example of a system for data validation that supports data validation for data record migrations in accordance with aspects of the present disclosure.

In some cloud platform systems, a user may store a set of data records in one or more tables at a source database, server, or similar data storage system. In order to increase the redundancy of the data records or for mobility purposes or for data residency compliance or for adopting new technology or adopting a new system of record, the user may migrate the set of data records to a target database. The cloud platform system may employ a data validation process to determine if the set of data records was fully and accurately migrated. Rather than performing a full row-by-row comparison of the records between the source and target databases, the cloud platform system may compare key bits of information between the source and target databases. These key bits of information may include a unique identifier for each row and a timestamp that indicates when the row was last modified. The signaling overhead, computational resources, and time needed to compare the key bits of information may be significantly less than the resources required to perform a row-by-row comparison. In some examples, these key bits of information may be indexed, which may further increase the efficiency of the migration validation process.

In accordance with aspects of the disclosure, a migration and validation server may perform a data validation process that includes comparing a calculated value from the source database and the target database that is based on unique identifiers and timestamps for each data record migrated from the source database to the target database. The unique identifier for each data record may include a primary key or alternate key that is unique to each data record. Additionally, the timestamp may include an indication of the last time the corresponding data record was created or updated. The migration and validation server may calculate a value based on the unique identifier and timestamp for each data record by utilizing a hash function.

The hash function may output a single bounded numeric value to uniquely identify the migrated set of data records at both the source database and the target database (e.g., calculate one hash value at the source database and one hash value at the target database). Therefore, if the set of data records at the source database and the target database have the same unique identifiers and timestamps for each data record, the hash function may calculate equivalent hash values for set of records at both the source database and the target database. The migration and validation server may determine if the data migration was successful if the hash value for the data records at the target database equals the hash value for the same data records at the source database.

In some cases, a first application server associated with the source database may drive the data migration. A second application server associated with the target database may transmit a calculated hash value for the data records at the target database to the first application server. The first application server may then compare the calculated value for the target database with a calculated hash value for the data records at the source database. If the calculated hash values are equal, the first application server may determine the data migration was successful.

Additionally, in some cases, the user may modify one or more data records at the source database during the data migration, which may, in turn, update the timestamp for the one or more data records modified. However, the data modifications may not be captured at the target database. After the data migration is initiated, one or more updated data records at the source database may not be migrated correctly to the target database. Therefore, modified data records at the source database may include updated timestamps, while the data records at the target database may include a first set of timestamps corresponding to the data records present initially at the source database.

Once the data migration is complete, the migration and validation server may calculate hash values for the data records at the source database and the target database. Since the data records at the source database have different timestamp values than the data records at the target database, the hash value for the data records at the source database may be different than the hash value for the data records at the target database, and the migration and validation server may determine that one or more data records have not been successfully migrated (e.g., the modified data records were not captured at the target database and, therefore, may have different data values than the corresponding data records at the source database). Additionally, the migration and validation server may calculate the hash values and perform a row count for the data records at the source database and the target database in a single instance (e.g., in one standard query language (SQL)).

The source database may transmit any modifications made during the data migration to the target database during a next occurring dead phase, where the user does not have access to the data records and is unable to make further modifications at the source database. After the modifications have been transmitted to the target database, the migration and validation server may calculate an additional or updated hash value for the data records at the target database and compare it with the previously calculated hash value for the data records at the source database. If the hash values are equal, then the migration and validation server may determine that the data modifications made at the source database were captured at the target database and both databases contain the same set of data records. Alternatively, if the hash values are different, then the migration and validation server may determine that both databases do not contain the same set of data records. As such, the user may attempt additional data migrations, modification updates, request the migration and validation server to perform additional hash value calculations, or another form of troubleshooting until the hash values at both databases are equal. In some cases, when comparing the hash values for the data records at the source and target databases, a comparison of a row count corresponding to the number of data records at each database may be included when determining a successful or unsuccessful data migration. Additionally or alternatively, the source or target database or an associated component of either database may perform the migration and validation process as described herein.

Aspects of the disclosure are initially described in the context of an environment supporting an on-demand database service. Further aspects of the disclosure are described with respect to a data validation process, data modification, modification update, and a process flow. Aspects of the disclosure are further illustrated by and described with reference to apparatus diagrams, system diagrams, and flowcharts that relate to data validation for data record migrations.

FIG. 1 illustrates an example of a system 100 for cloud computing that supports efficient data validation for data migration in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, a cloud client 105 (e.g., a user) may store a set of data records on a source data center 120 (e.g., a source database, server, or other data storage component or system). As described above, the cloud client 105 may backup the data at a different data center 120 (e.g., a target database) with copies of the data. In order to supply the different data center 120 with the copies of the data, the cloud client may perform a data migration of the data from the source data center 120 to the different data center 120. The cloud client 105, or a validation component associated with the data center 120, may further perform a data validation process on the data at the target database compared with the data at the source database to ensure the data has been transferred correctly.

System 100 may support efficient techniques for a data validation process after a data migration. For example, a validation component, which may be a component of the cloud client 105, cloud platform 115 or data center 120, may perform a data validation process that includes comparing a calculated value from a source data center 120 and a target data center 120 that is based on unique identifiers and timestamps for each data record in a set of data records migrated from the source data center 120 to the target data center 120. The unique identifier for each data record may include a primary key or alternate key that is unique to each data record. Additionally, the timestamp may include an indication of the last time the corresponding data record was modified or updated. The validation component may calculate a hash value at each data center 120 based on the unique identifier and timestamp for each data record by utilizing a hash function. The validation component may determine if the data migration was successful (e.g., the data was transferred correctly) if the hash value calculated for the data records at the target data center 120 equals the hash value calculated for the corresponding data records at the source data center 120.

Figure 2:
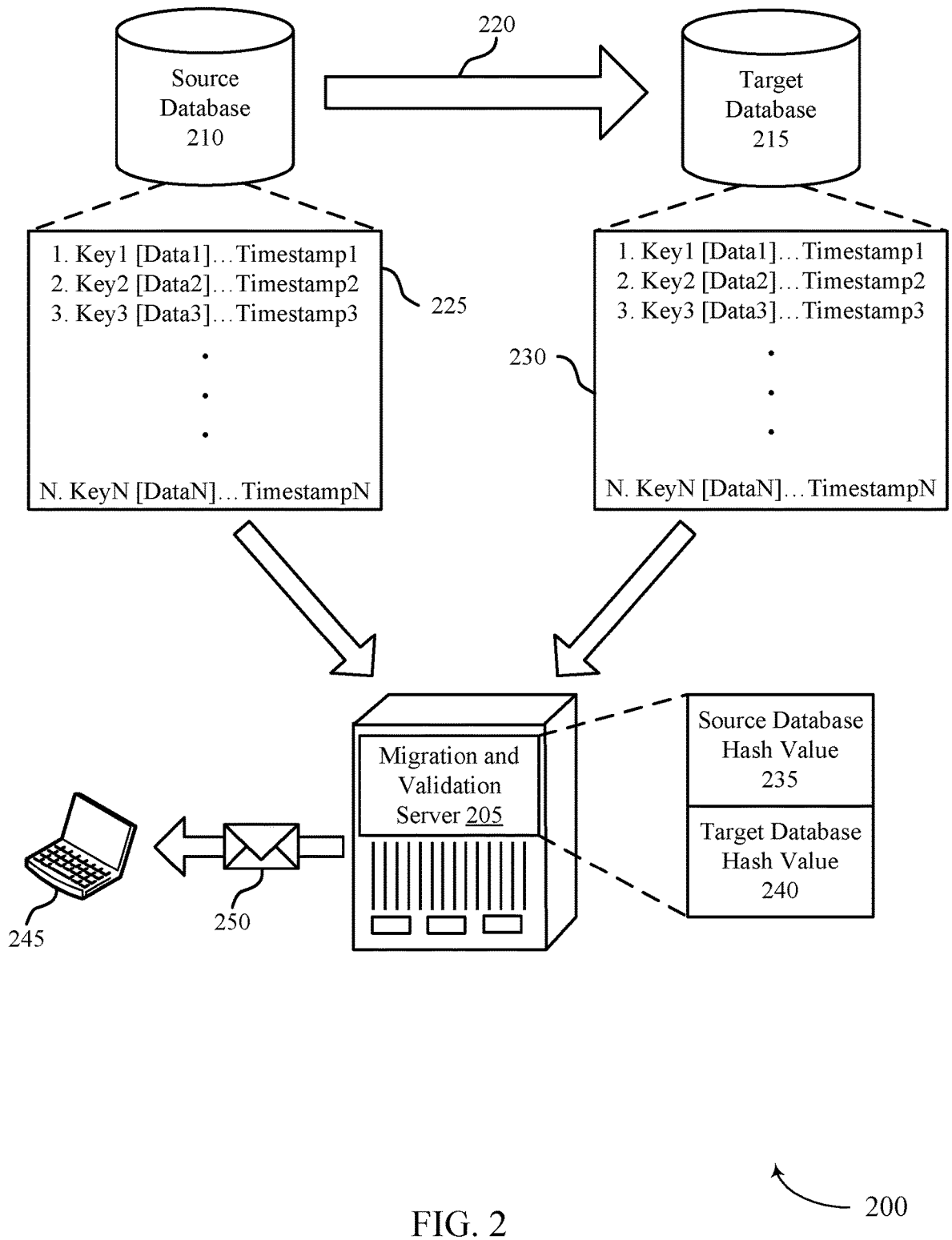
FIG. 2 illustrates an example of a data validation process that supports data validation for data record migrations in accordance with aspects of the present disclosure.

FIG. 2 illustrates an example of a data validation process 200 that supports data validation for data record migrations in accordance with various aspects of the present disclosure. Data validation process 200 may include a migration and validation server 205 that performs a data migration 220 from a source database 210 to a target database 215 for a data backup. Migration and validation server 205 may be an example of the validation component as described with reference to FIG. 1. Additionally, source database 210 and target database 215 may be examples of data centers 120 as described with reference to FIG. 1. After performing data migration 220, migration and validation server 205 may perform a data validation process to determine if data migration 220 was successful.

Data migration 220 may include copying a set of source data records 225 and transferring the copy from source database 210 to target database 215. The source set of data records 225 may include N data records. In some cases, data migration 220 may include migrating a subset of the set of source data records 225 (i.e., less than N). Additionally or alternatively, the set of source data records 225 may be included in a table of data records with N rows or multiple tables of data records with a total of N rows. Each data record in the set of source data records 225 may include a primary or alternate key (e.g., a unique identifier), one or more columns of data, and a corresponding timestamp, where the timestamp may indicate the last time the associated data record was modified or updated. For example, a first data record may include a Key1, Data1, and a Timestamp1; a second data record may include a Key2, Data2, and a Timestamp2; and so on up to an Nth data record that may include a KeyN, DataN, and a TimestampN. In some cases, one or more data records in the set of source data records 225 may not include a primary or alternate key, a timestamp, or both. After data migration 220, target database 215 may contain a set of target data records 230.

In some cases, migration and validation server 205 may perform data validation process 200 after data migration 220 to determine if the set of target data records 230 match the set of source data records 225. Accordingly, migration and validation server 205 may compare a calculated value from source database 210 and target database 215 that is based on the primary or alternate keys and timestamps for each data record migrated from source database 210 to target database 215. Migration and validation server 205 may calculate a value based on the unique identifier and timestamp for each data record by utilizing a hash function. As noted above, if a data record does not include either a unique identifier or a timestamp or both, migration and validation server 205 may utilize the hash function to calculate a value based on which criteria is included (i.e., either the unique identifier alone or the timestamp alone) or based off different information for each table or schema of data records (e.g., types of indexes available, based on what data is migrated, monitoring or investigative purposes, a non-unique index, table access, etc.). Migration and validation server 205 may identify the unique identifier and timestamp (or different information) for each table or schema of data records based on an index, where the index indicates locations in the set of data records where the unique identifier and timestamp may be found. For example, if the sets of data records are included in a table format, the index may indicate which columns of the table include the desired information. Therefore, migration and validation server 205 may efficiently retrieve the inputs for the hash functions.

The hash function may output a single bounded numeric value to uniquely identify the migrated set of data records at both source database 210 and target database 215. For example, migration and validation server 205 may calculate a source database hash value 235 for the set of source data records 225 and a target database hash value 240 for the set of target data records 230. If the set of source data records 225 and the set of target data records 230 have the same unique identifiers and timestamps for each data record, the hash function may calculate an equivalent source database hash value 235 and target database hash value 240. Migration and validation server 205 may determine if data migration 220 was successful if target database hash value 240 equals source database hash value 235. In some cases, migration and validation server 205 may include a row count comparison in data validation process 200 in addition to the hash value comparison. For example, if source database hash value 235 and target database hash value are equal and if the set of source data records 225 migrated over and the set of target data records 230 have the same number of N rows (i.e., the same number of data records), migration and validation server 205 may determine data migration 220 was successful.

In some cases, migration and validation server 205 may correspond to a first application server associated with source database 210 that drives data migration 220 and performs the data validation process 200. A second application server associated with target database 215 may transmit target database hash value 240 to the first application server. The first application server may then compare target database hash value 240 with source database hash value 235. If the calculated hash values are equal, the first application server may determine data migration 220 was successful.

Migration and validation server 205 may transmit a result message 250 associated with the data validation process 200 to a user 245, where result message 250 indicates if data migration 220 was successful or unsuccessful. Result message 250 may be transmitted to user 245 as part of a communication with user 245 (e.g., an e-mail, ping, notification, etc.). In some cases, user 245 may have read-write authority over the data records. If result message 250 indicates an unsuccessful data migration 220 (e.g., target database hash value 240 does not equal source database hash value 235), user 245 may investigate the reason why it was unsuccessful and modify the data at either database. Additionally, the data migration may be canceled if a customer associated with the target database has not been active, resulting in an unsuccessful data migration 220. In some cases, user 245 may modify one or more data records in the set of source data records 225 while data migration 220 is ongoing. As such, the data modifications may not be reflected at target database 215, which may result in different calculated hash values and a determined unsuccessful data migration 220.

Data migration 220 may occur during both a live phase and a dead phase. While in the live phase, user 245 may have access to the set of source data records 225 and modify one or more of the data records while data migration is occurring. Accordingly, migration and validation server 205 may transmit live data from source database 210 to target database 215, which may or may not include any data modifications made while the data is live. When data migration 220 transitions to the dead phase, user 245 may become locked out from the set of source data records 225 and no longer have access to modify any of the data records. Migration and validation server 205 may continue to perform data migration 220 based on a current set of source data records 225 when data migration 220 enters the dead phase. After data migration 220 is complete, migration and validation server 205 may perform data validation process 200 as described above while in the dead phase. If different hash values are calculated or unexpected changes occur, migration and validation server 205 may perform different troubleshooting techniques to determine if data migration 220 was successful. For example, as described above, since data modifications may happen during the live phase, the data modifications may not be captured during data migration 220, which may result in different calculated hash values and data migration 220 determined as unsuccessful when data validation process 200 is performed in the dead phase. As such, migration and validation server 205 or user 245 may perform an additional data migration 220, recalculate the hash values, or perform similar troubleshooting techniques to determine if the data records at source database 210 and target database 215 match.

Figure 3:
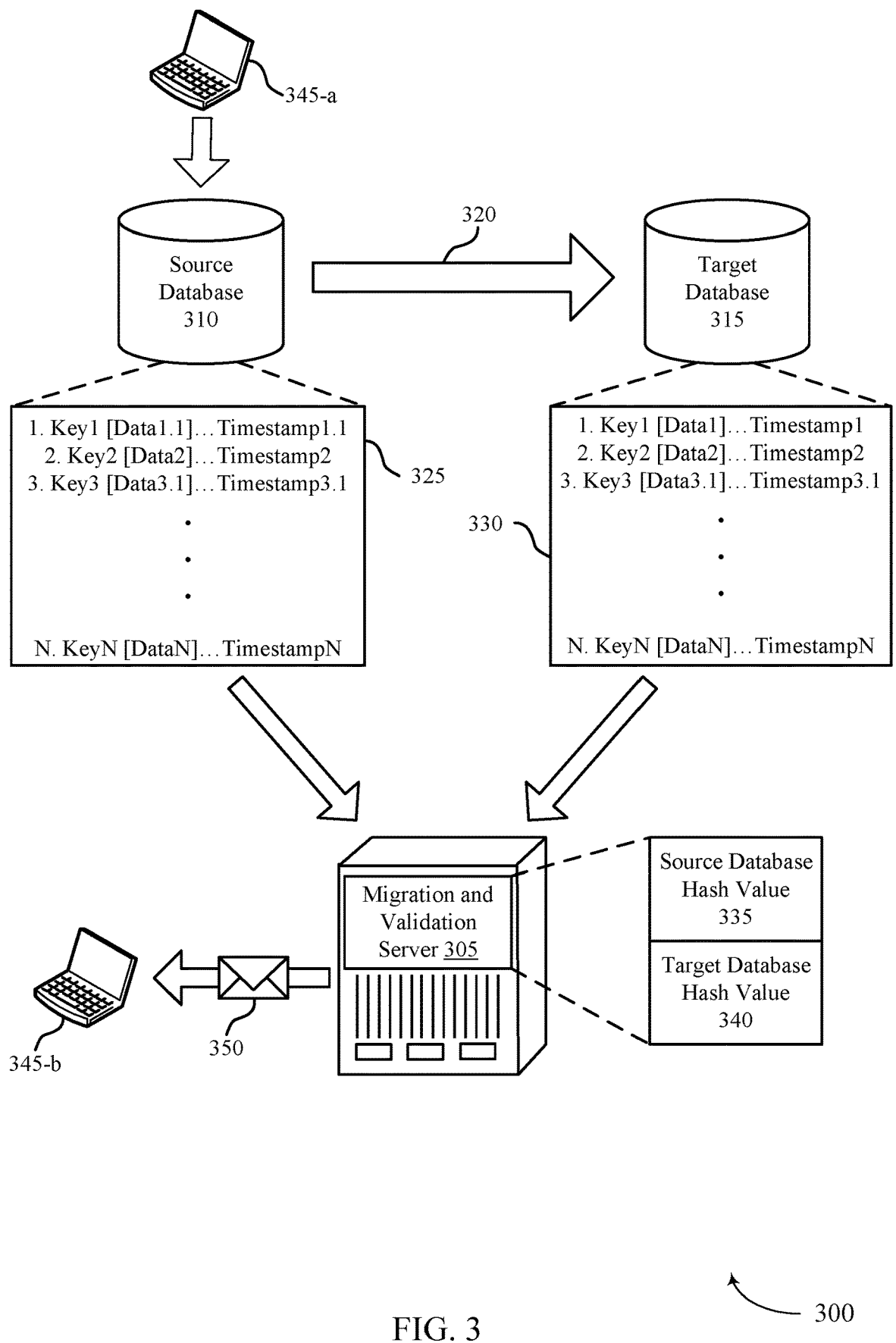
FIG. 3 illustrates an example of a data modification that supports data validation for data record migrations in accordance with aspects of the present disclosure.

FIG. 3 illustrates an example of a data modification 300 that supports data validation for data record migrations in accordance with various aspects of the present disclosure. Data modification 300 may include a user 345-a that makes a modification to one or more data records in a set of source data records 325 while a data migration 320 is occurring. Data migration 320 may employ similar techniques as described above with reference to data migration 220 in FIG. 2. For example, a migration and validation server 305 may migrate a set or subset of data records from a source database 310 to a target database 315 and perform a data validation process on the migrated data records to determine if data migration 320 was successful. Additionally or alternatively, as noted above, migration and validation server 305 may correspond to a first application server associated with source database 310 that drives the data migration and performs the data validation process.

In some cases, after data migration 320 is initiated, a user may modify one or more data records in a set of source data records 325. For example, the user may modify some portion of data for a first data record (e.g., Data1.1) and some portion of data for a third data record (e.g., Data3.1). Accordingly, the modified set of source data records 325 may include updated timestamps (e.g., Timestamp1.1 and Timestamp3.1). However, since the modifications are made while the set of source data records 325 remains live (i.e., the user can access and modify the data records while data migration 320 occurs), not all of the modifications may be captured at target database 315. For example, the first data record may have been updated at source database 310 after the first data record had been migrated over or a different issue prevented the updated first data record from being migrated appropriately. As such, the first data record a set of target data resources 330 may include data and a timestamp corresponding to an initial, unmodified set of data (e.g., Data1 and Timestamp1). Alternatively, the updated third record may have been migrated to target database 315 correctly, which may be indicated by the updated timestamp for the third data record in the set of target data resources 330 (e.g., Timestamp3.1).

Once data migration 320 is complete, migration and validation server 305 may calculate a source database hash value 335 and a target database hash value 340. Since one or more data records were not migrated correctly because of the live modifications, source database hash value 335 may be different than target database hash value 340, and migration and validation server 305 may determine that one or more data records have not been successfully migrated. For example, the modified first data record may not have been captured at target database 315 and, therefore, may have a different timestamp than the corresponding first data record at source database 310 (e.g., the first data record at source database 310 includes Timestamp1.1 and the corresponding first data record at target database 315 includes Timestamp1). Therefore, since the hashing function relies on a unique identifier and timestamp, the calculated hash values may be different for the set of source data records 325 and the set of target data records 330. In some cases, background jobs running on source database 310 or target database 315 may touch and modify one or more data records. Accordingly, source database hash value 335 or target database hash value 340 may be affected such that the hash values are not equal, indicating data migration 320 was unsuccessful.

After determining data migration 320 was unsuccessful, migration and validation server 305 may transmit a result message 350 to a user 345-b that indicates the unsuccessful data migration 320. In some cases, user 345-a and user 345-b may be the same user 345 with read-write abilities for the data records. Based on the determination, user 345-b may determine that the modified data records were not captured at target database and wait for the modified data records to be transmitted from source database 310 to target database 315 during a dead phase (e.g., the data records are locked down). Additionally or alternatively, user 345-b may indicate for migration and validation server 305 to run data migration 320 again to try and capture any previous modifications.

Figure 4:
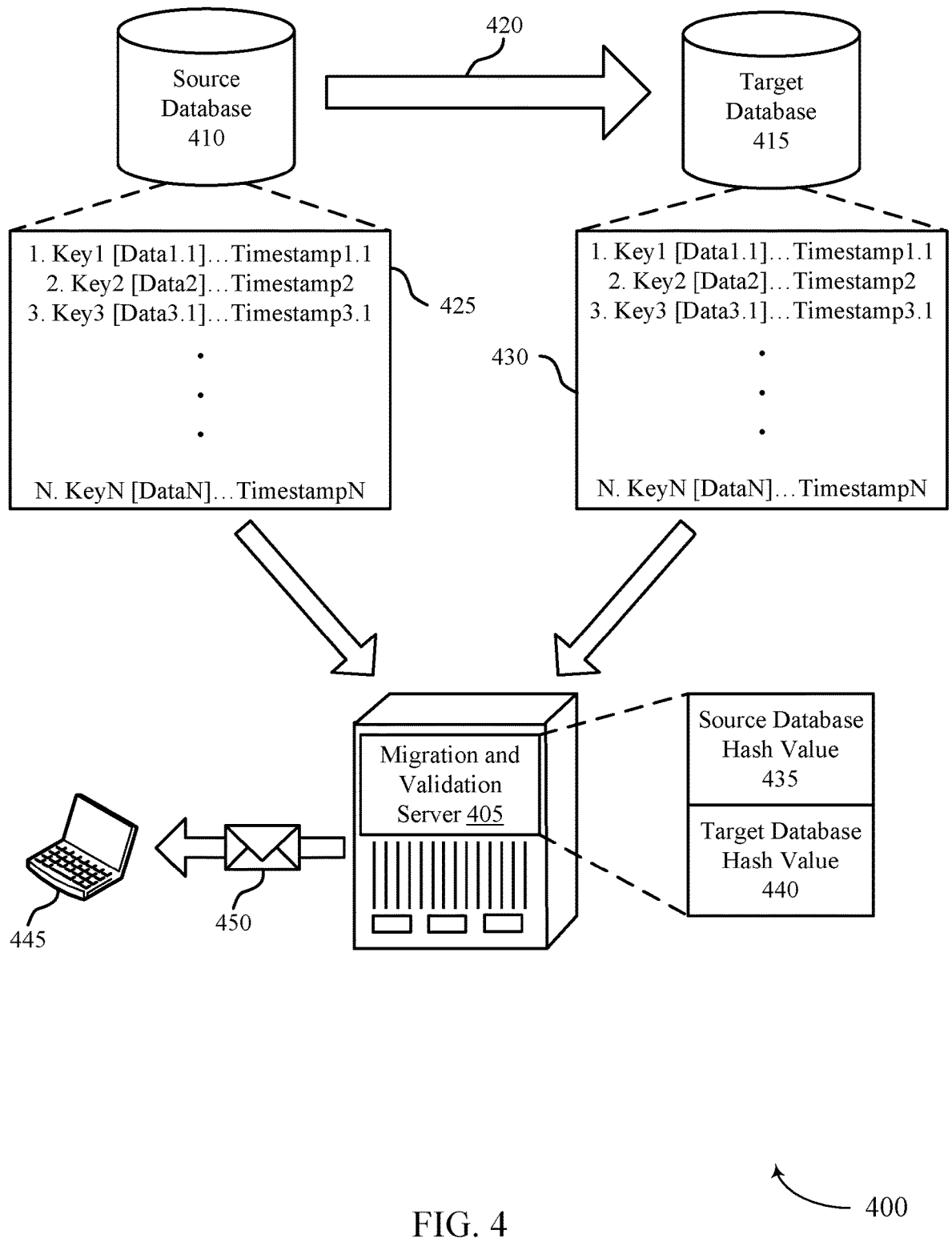
FIG. 4 illustrates an example of a modification update that supports data validation for data record migrations in accordance with aspects of the present disclosure.

FIG. 4 illustrates an example of a modification update 400 that supports data validation for data record migrations in accordance with various aspects of the present disclosure. Modification update 400 may include a modification transmission 420, where modifications made to one or more data records on a set of source data records 425 are transmitted from a source database 410 to a target database 415. A user may modify the set of source data records 425 as described with reference to data modification 300 in FIG. 3.

In some cases, modification transmission may occur during a next occurring dead phase after the modifications are made. The dead phase may include an instance where the user does not have access to the data records and is unable to make further modifications at source database 410. After the modifications have been transmitted to target database 415, a migration and validation server 405 may calculate an updated target database hash value 440 for the set of target data records 430 and compare it with a calculated source database hash value 435. If the hash values are equal, then migration and validation server 405 may determine that the data modifications made at source database 410 were captured at target database 415 and both databases contain the same set or subset of data records. For example, a first modified data record with a first key may have the same timestamp (e.g., Timestamp1.1) and a third modified data record with a third key may have the same timestamp (e.g., Timestamp3.1) at both databases (e.g., other data records were not modified). As such, migration and validation server 405 may calculate an equivalent value for both source database hash value 435 and target database hash value 440 and determine that the set of target data records 430 match the set of source data records 425. Alternatively, if the hash values are different, migration and validation server 405 may determine that the databases do not contain the same set or subset of data records.

Migration and validation server 405 may transmit a result message 450 to a user 445 containing the indication of the successful or unsuccessful data migration. If the data migration was unsuccessful, user 445 may attempt additional data migrations, modification updates, perform additional hash value calculations, or another form of troubleshooting until the hash values at both databases are equal. In some cases, source database 410 or target database 415 or an associated component of either database may perform the migration and validation process as described herein.

Figure 5:
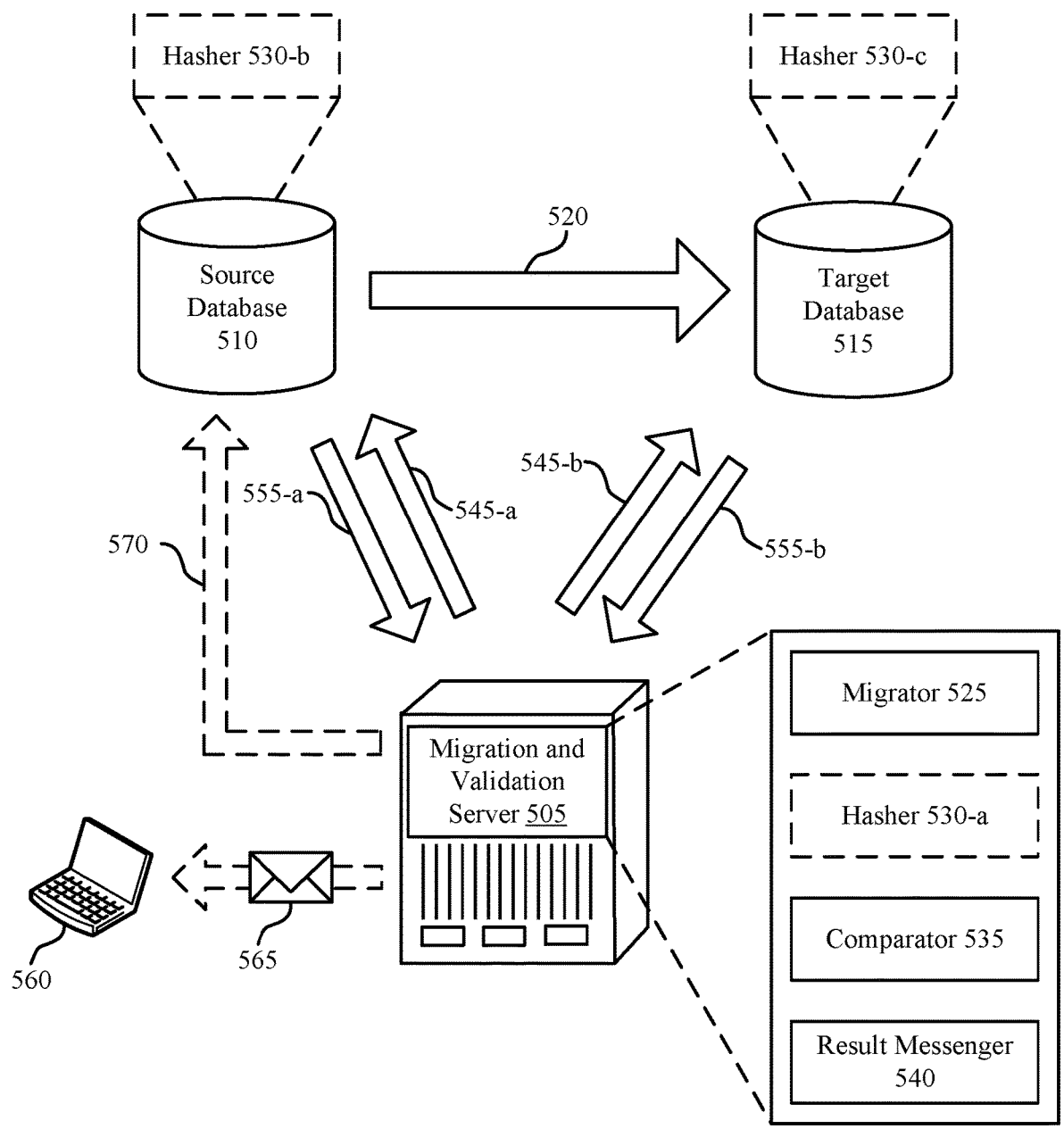
FIG. 5 illustrates an example of a data validation system that supports data validation for data record migrations in accordance with aspects of the present disclosure.

FIG. 5 illustrates an example of a data validation system 500 that supports data validation for data record migrations in accordance with various aspects of the present disclosure. Data validation system 500 may include a data migration 520 and a validation process performed by a migration and validation server 505, which may be an example of a migration and validation server as described above with reference to FIGS. 2-4. Migration and validation server 505 may migrate a set of data records from a source database 510 to a target database 515.

In some cases, migration and validation server 505 may include multiple components for performing data migration 520 and the validation process. For example, migration and validation server 505 may include a migrator 525, a hasher 530-a, a comparator 535, and a result messenger 540. Migrator 525 may initiate and carry out data migration 520 between source database 510 and target database 515. Hasher 530-a may calculate a hash value for the set of data records at source database 510 and a hash value for the set of data records at target database 515. The hash values may be calculated as described above with reference to FIG. 2. Additionally or alternatively, each database may calculate a hash value for the set of data records associated with themselves. For example, source database 510 may include a hasher 530-b that calculates the hash value for the set of data records at source database 510, and target database 515 may include a hasher 530-c that calculates the hash value for the set of data records at target database 515. As described herein, the hash value may be calculated based on a unique identifier and timestamp for each data record at each database. However, one or more data records may not include either a unique identifier or a timestamp or both. Accordingly, the hash value may be calculated based on different inputs (e.g., unique identifier aloneor based on types of indexes available, based on what data is migrated, for monitoring or investigative purposes, a non-unique index, table access, etc.).

In some cases, migration and validation server 505 may transmit queries 545 to both databases to indicate requests for data associated with the hash values. If migration and validation server 505 calculates the hash values, query 545-a and query 545-b may request unique identifiers and timestamps (or additional information if no unique identifier or timestamp is included) for each data record from source database 510 and target database 515, respectively. In some cases, source database 510 and target database 515 may transmit the requested information (e.g., the unique identifiers and timestamps for each data record) on responses 555-a and 555-b, respectively, and migration and validation server 505 may calculate the hash values with hasher 530-a accordingly. In some cases, query 545-a and query 545-b may indicate which columns are needed for the hash values, and each database may return the hash value accordingly. Migration and validation server 505 may construct the query including which index to use for the indicated columns. Alternatively, source database 510 and target database 515 may transmit all of the data records, including the data portions for each data record, to migration and validation server 505. If all of the data is transmitted, migration and validation server 505 may locate the appropriate data record information based on an index that indicates the locations of the unique identifiers and timestamps for each data record. In some cases, if each database calculates the hash values with a corresponding hasher 530, queries 545 may request the hash value from each database. Accordingly, source database 510 may transmit the calculated hash value from hasher 530-b on response 555-a, and target database 515 may transmit the calculated hash value from hasher 530-c on response 555-b.

Comparator 535 may compare the hash value for the set of data records at source database 510 with the hash value for the set of data records at target database 515. Result messenger 540 may transmit a result message 565 to a user 560 based on the comparison from comparator 535. For example, if comparator 535 determines that the hash values are equal, migration and validation server 505 may transmit result message 565 to user 560 that indicates data migration 520 was successful. Alternatively, if comparator 535 determines that the hash values are different, migration and validation server 505 may transmit result message 565 to user that indicates data migration 520 was unsuccessful. Additionally, if the hash values are different, migration and validation server 505 may transmit one or more instructions 570 to source database 510. In some cases, instructions 570 may include an indication to migrate the set of data records again, transmit any modifications made to the set of records to target database 515, etc. Migration and validation server 505 may perform additional migrations, calculate or receive additional hash values, indicate source database 510 to transmit modified data records, or perform additional troubleshooting techniques until equivalent hash values are calculated for source database 510 and target database 515, signifying a successful data migration.

Figure 6:
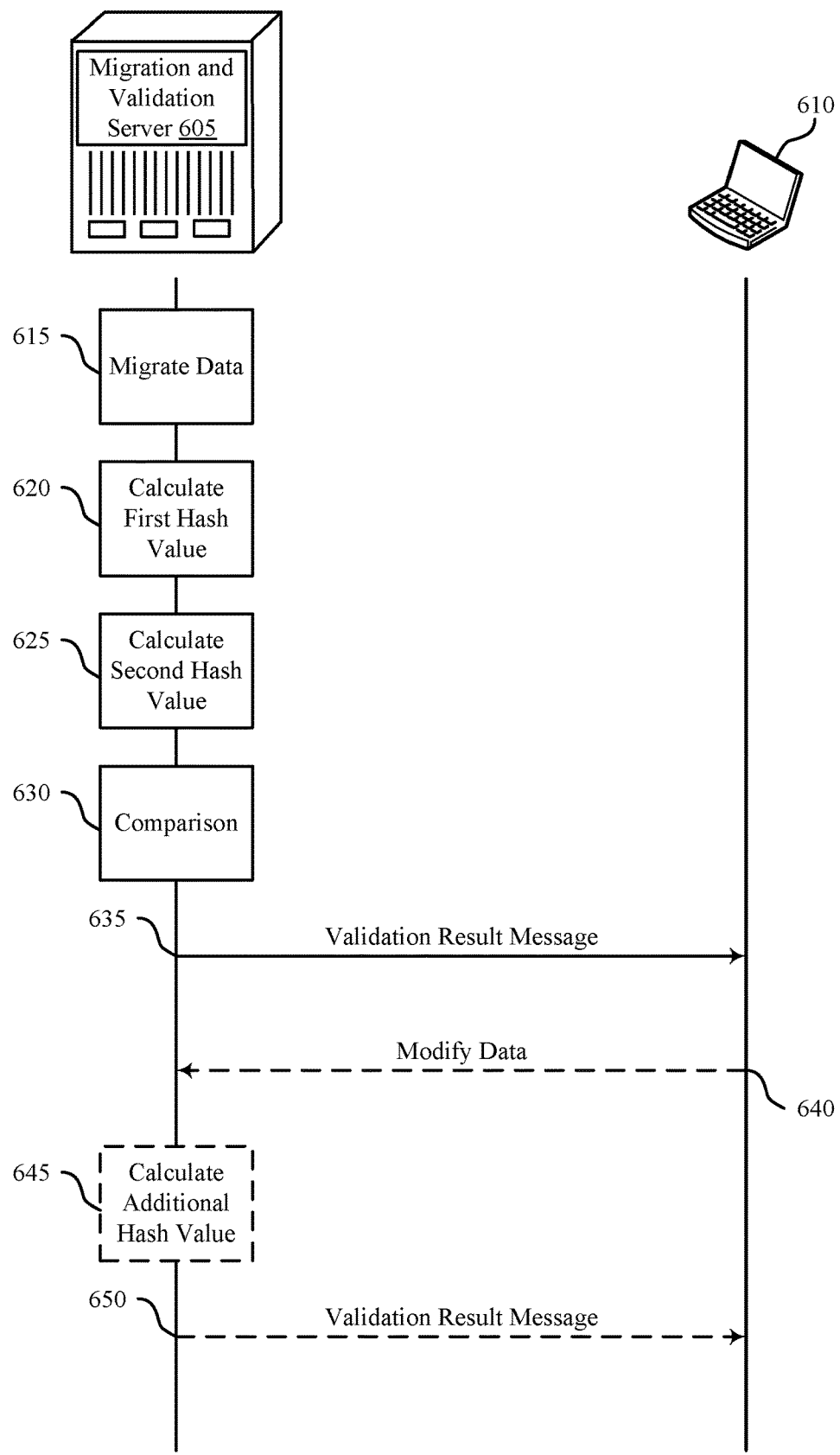
FIG. 6 illustrates an example of a process flow that supports data validation for data record migrations in accordance with aspects of the present disclosure.

FIG. 6 illustrates an example of a process flow 600 that supports data validation for data record migrations in accordance with various aspects of the present disclosure. Process flow 600 may include a migration and validation server 605 and a user 610, which may be examples of respective devices as described above with reference to FIGS. 2-5. Migration and validation server 605 may initiate and perform a data migration from a source database to a target database. After the data migration is complete, migration and validation server 605 may then perform a data validation process to determine if the migrated data is the same at both databases.

In the following description of the process flow 600, the operations between the migration and validation server 605 and user 610 may be performed in different orders or at different times. Certain operations may also be left out of process flow 600, or other operations may be added to process flow 600.

At 615, migration and validation server 605 may migrate a set of data records from a source database to a target database, where each data record includes a timestamp and a record identifier. The record identifier for each data record may include a primary key or an alternate key. In some cases, the set of data records may remain live at the source database during the migration. For example, migration and validation server 605 or user 610 may access the set of data records at the source database while migrating the set of data records based on the set of data records remaining live. In some case, the set of data records may include one or more tables of data records. Additionally, migration and validation server 605 may migrate a subset of the one or more tables of data records.

At 620, migration and validation server 605 may calculate a first hash value for the set of data records at the source database according to a hashing function, where the hashing function calculates the first hash value based on the record identifier and the timestamp for each data record of the set of data records at the source database. Alternatively, as described above, the source database may calculate the first hash value and transmit the hash value to migration and validation server 605.

At 625, migration and validation server 605 may calculate a second hash value for the set of data records at the target database according to the hashing function, where the hashing function calculates the second hash value based on the record identifier and the timestamp for each data record of the set of data records at the target database. Alternatively, as described above, the target database may calculate the second hash value and transmit the hash value to migration and validation server 605.

At 630, migration and validation server 605 may compare the first hash value and the second hash value. Additionally, migration and validation server 605 may compare a first row count for the set of data records at the source database and a second row count for the set of data records at the target database. In some cases, migration and validation server 605 may determine the first hash value and second hash value are equal based on the comparison. Alternatively, migration and validation server 605 may determine the first hash value and second hash value are different based comparison.

At 635, migration and validation server 605 may transmit a validation result message to user 610 based on the comparison. In some cases, the validation result message may be based on the row count comparison. Additionally or alternatively, the validation result message may indicate a successful migration if the first hash value and second hash value are determined to be equal. Alternatively, the validation result message may indicate an unsuccessful migration if the first hash value and second hash value are determined to be different.

At 640, user 610 may indicate one or more data modifications to the set of data records at the source database. Accordingly, migration and validation server 605 may modify corresponding one or more data records of the set of data records at the source database during the migration. Additionally, migration and validation server 605 may update the timestamp for the one or more modified data records at the source database. In some cases, migration and validation server 605 may transmit the one or more modified data records to the target database during a dead phase, where the dead phase includes a period where the set of data records are locked down.

At 645, migration and validation server 605 may calculate an additional hash value for the set of data records at the source database according to the hashing function, where the hashing function calculates the additional hash value based on the record identifier and the updated timestamp for each data record of the set of data records at the source database. Accordingly, migration and validation server 605 may compare the additional hash value and the second hash value. In some cases, migration and validation server 605 may determine the additional hash value and second hash value are equal based on the comparison. Alternatively, migration and validation server 605 may determining the additional hash value and second hash value are different based on the comparison.

At 650, migration and validation server 605 may transmit a validation result message to user 610 based on the comparison. In some cases, the validation result message may indicate a successful migration if the additional hash value and second hash value are determined to be equal. Alternatively, the validation result message may indicate an unsuccessful migration if the additional hash value and second hash value are determined to be different. If the migration was unsuccessful, migration and validation server 605 may continue to perform data migrations, provide data updates, and calculate additional hash values until a hash value for the source database equals a hash value for the target database.

Figure 7:
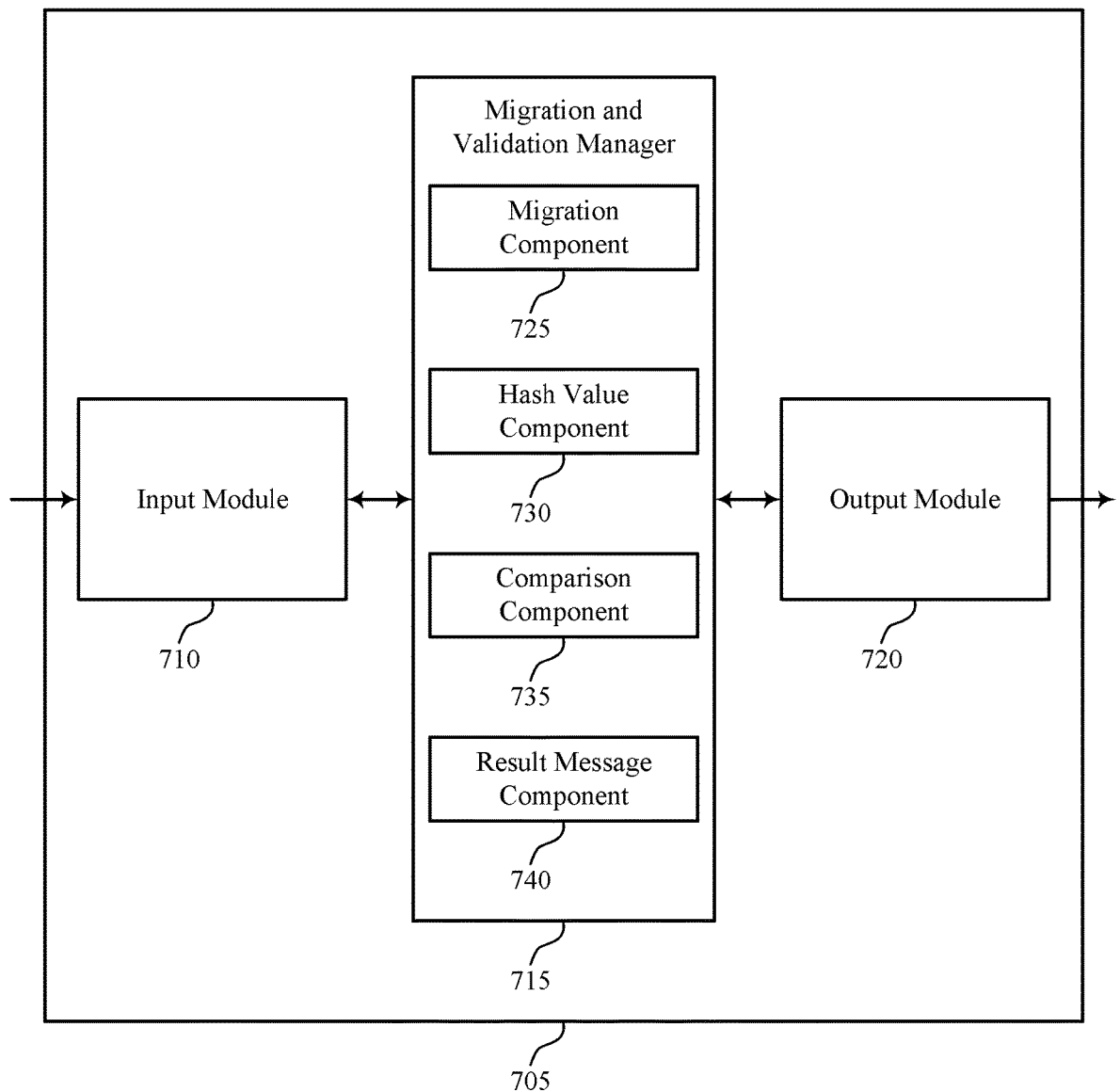
FIGS. 7 through 8 show block diagrams of a device that supports data validation for data record migrations in accordance with aspects of the present disclosure.

FIG. 7 shows a block diagram 700 of an apparatus 705 that supports data validation for data record migrations in accordance with aspects of the present disclosure. Apparatus 705 may include input module 710, migration and validation manager 715, and output module 720. Apparatus 705 may also include a processor. Each of these components may be in communication with one another (e.g., via one or more buses). In some cases, apparatus 705 may be an example of a user terminal, a database server, or a system containing multiple computing devices.

Migration and validation manager 715 may be an example of aspects of the migration and validation manager 915 described with reference to FIG. 9.

Migration and validation manager 715 and/or at least some of its various sub-components may be implemented in hardware, software executed by a processor, firmware, or any combination thereof. If implemented in software executed by a processor, the functions of the migration and validation manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The migration and validation manager 715 and/or at least some of its various sub-components may be physically located at various positions, including being distributed such that portions of functions are implemented at different physical locations by one or more physical devices. In some examples, migration and validation manager 715 and/or at least some of its various sub-components may be a separate and distinct component in accordance with various aspects of the present disclosure. In other examples, migration and validation manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Migration and validation manager 715 may also include migration component 725, hash value component 730, comparison component 735, and result message component 740.

Migration component 725 may migrate a set of data records from a source database to a target database, where each data record includes a timestamp and a record identifier and migrate a subset of one or more tables of data records. In some cases, the set of data records remains live at the source database during the migration. In some cases, the record identifier for each data record includes a primary key or an alternate key. In some cases, the set of data records includes one or more tables of data records.

Hash value component 730 may calculate a first hash value for the set of data records at the source database according to a hashing function, where the hashing function calculates the first hash value based on the record identifier and the timestamp for each data record of the set of data records at the source database; and calculate a second hash value for the set of data records at the target database according to the hashing function, where the hashing function calculates the second hash value based on the record identifier and the timestamp for each data record of the set of data records at the target database. In some cases, hash value component 730 may calculate an additional hash value for the set of data records at the source database according to the hashing function, where the hashing function calculates the additional hash value based on the record identifier and the updated timestamp for each data record of the set of data records at the source database.

Comparison component 735 may compare the first hash value and the second hash value and compare the additional hash value and the second hash value. In some cases, comparing the first validation value and the second validation value further includes comparing a first row count for the set of data records at the source database and a second row count for the set of data records at the target database.

Result message component 740 may transmit a validation result message based on the comparison, transmit the validation result message based on the row count comparison, and transmit the validation result message based on the comparison of the additional hash value and the second hash value. In some cases, transmitting the validation result message further includes determining the first hash value and second hash value are equal based on the comparison, where the validation result message indicates a successful migration. In some cases, transmitting the validation result message further includes determining the first hash value and second hash value are different based on the comparison, where the validation result message indicates an unsuccessful migration. In some cases, transmitting the validation result message further includes determining the additional hash value and second hash value are equal based on the comparison, where the validation result message indicates a successful migration. In some cases, transmitting the validation result message further includes determining the additional hash value and second hash value are different based on the comparison, where the validation result message indicates an unsuccessful migration.

Figure 8:
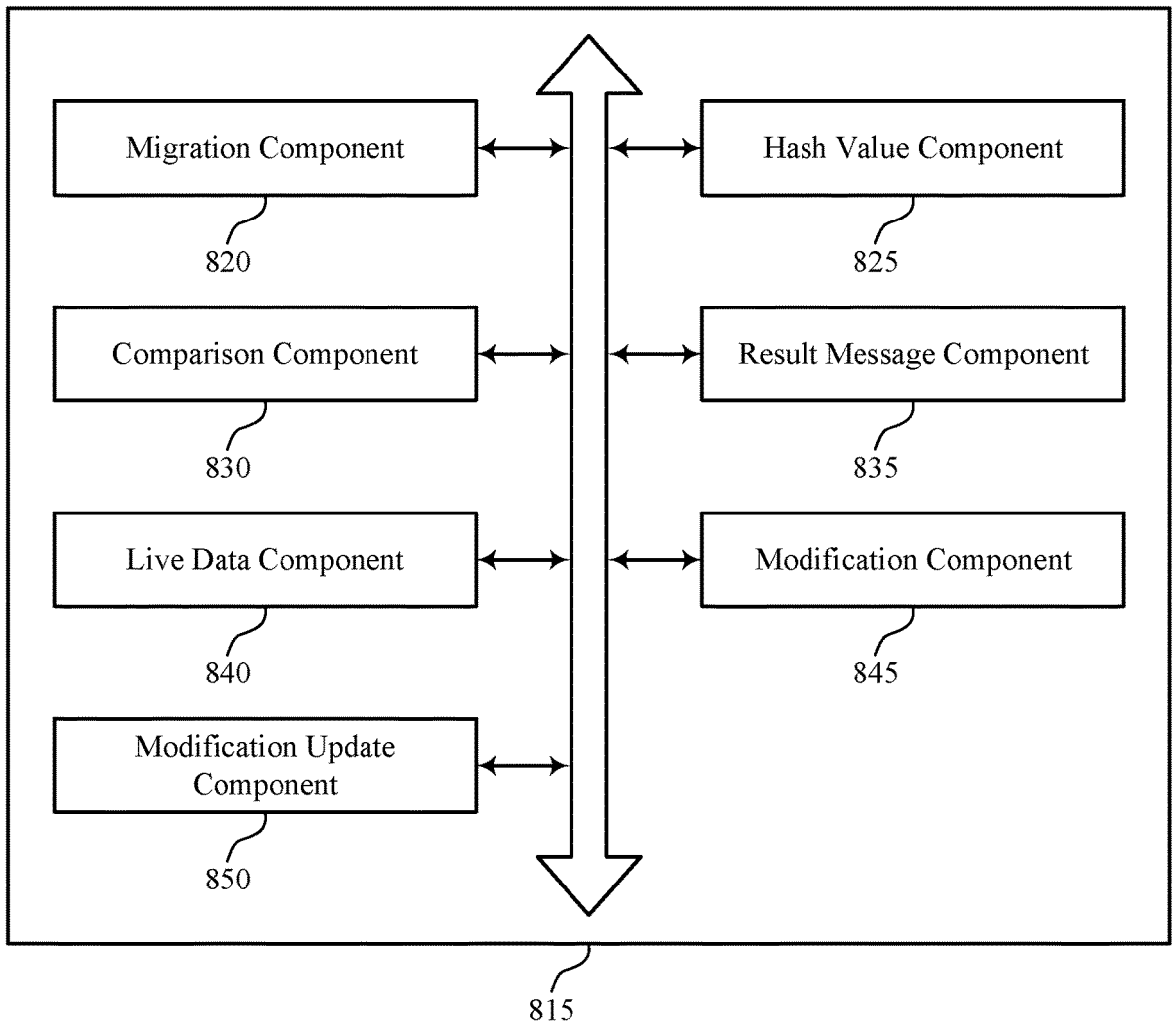

FIG. 8 shows a block diagram 800 of a migration and validation manager 815 that supports data validation for data record migrations in accordance with aspects of the present disclosure. The migration and validation manager 815 may be an example of aspects of a migration and validation manager 715 or 915 described with reference to FIGS. 7 and 9. The migration and validation manager 815 may include migration component 820, hash value component 825, comparison component 830, result message component 835, live data component 840, modification component 845, and modification update component 850. Each of these modules may communicate, directly or indirectly, with one another (e.g., via one or more buses).

Migration component 820 may migrate a set of data records from a source database to a target database, where each data record includes a timestamp and a record identifier and migrate a subset of one or more tables of data records. In some cases, the set of data records remains live at the source database during the migration. In some cases, the record identifier for each data record includes a primary key or an alternate key. In some cases, the set of data records includes one or more tables of data records.

Hash value component 825 may calculate a first hash value for the set of data records at the source database according to a hashing function, where the hashing function calculates the first hash value based on the record identifier and the timestamp for each data record of the set of data records at the source database; and calculate a second hash value for the set of data records at the target database according to the hashing function, where the hashing function calculates the second hash value based on the record identifier and the timestamp for each data record of the set of data records at the target database. In some cases, hash value component 825 may calculate an additional hash value for the set of data records at the source database according to the hashing function, where the hashing function calculates the additional hash value based on the record identifier and the updated timestamp for each data record of the set of data records at the source database.

Comparison component 830 may compare the first hash value and the second hash value and compare the additional hash value and the second hash value. In some cases, comparing the first validation value and the second validation value further includes comparing a first row count for the set of data records at the source database and a second row count for the set of data records at the target database.

Result message component 835 may transmit a validation result message based on the comparison, transmit the validation result message based on the row count comparison, and transmit the validation result message based on the comparison of the additional hash value and the second hash value. In some cases, transmitting the validation result message further includes determining the first hash value and second hash value are equal based on the comparison, where the validation result message indicates a successful migration. In some cases, transmitting the validation result message further includes determining the first hash value and second hash value are different based on the comparison, where the validation result message indicates an unsuccessful migration. In some cases, transmitting the validation result message further includes determining the additional hash value and second hash value are equal based on the comparison, where the validation result message indicates a successful migration. In some cases, transmitting the validation result message further includes determining the additional hash value and second hash value are different based on the comparison, where the validation result message indicates an unsuccessful migration.

Live data component 840 may access the set of data records at the source database while migrating the set of data records based on the set of data records remaining live.

Modification component 845 may modify one or more data records of the set of data records at the source database during the migration and update the timestamp for the one or more modified data records.

Modification update component 850 may transmit the one or more modified data records to the target database during a dead phase, where the dead phase includes a period where the set of data records are locked down.

Figure 9:
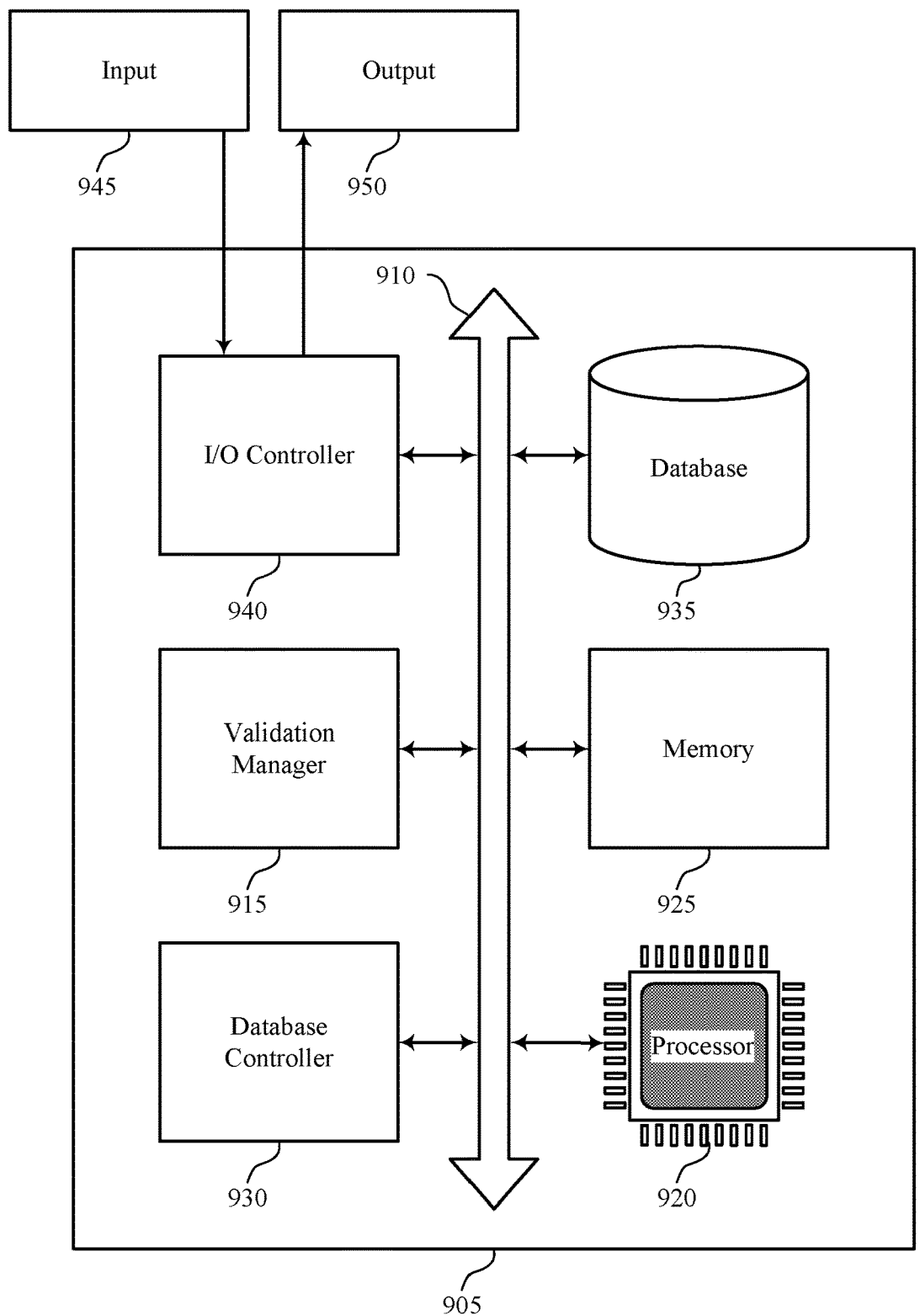
FIG. 9 illustrates a block diagram of a system including a migration and validation server that supports data validation for data record migrations in accordance with aspects of the present disclosure.

FIG. 9 shows a diagram of a system 900 including a device 905 that supports data validation for data record migrations in accordance with aspects of the present disclosure. Device 905 may be an example of or include the components of migration and validation server 205, 305, 405, 505, or 605 as described above, e.g., with reference to FIGS. 2-6. Device 905 may include components for bi-directional data communications including components for transmitting and receiving communications, including validation manager 915, processor 920, memory 925, database controller 930, database 935, and I/O controller 940. These components may be in electronic communication via one or more buses (e.g., bus 910).

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting efficient data validation in a migration).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Database controller 930 may manage data storage and processing in database 935. In some cases, a user may interact with database controller 930. In other cases, database controller 930 may operate automatically without user interaction.

Database 935 may be an example of a single database, a distributed database, multiple distributed databases, or an emergency backup database.

I/O controller 940 may manage input and output signals for device 905. I/O controller 940 may also manage peripherals not integrated into device 905. In some cases, I/O controller 940 may represent a physical connection or port to an external peripheral. In some cases, I/O controller 940 may utilize an operating system such as iOS®, ANDROID®, MS-DOS®, MS-WINDOWS®, OS/2®, UNIX®, LINUX®, or another known operating system. In other cases, I/O controller 940 may represent or interact with a modem, a keyboard, a mouse, a touchscreen, or a similar device. In some cases, I/O controller 940 may be implemented as part of a processor. In some cases, a user may interact with device 905 via I/O controller 940 or via hardware components controlled by I/O controller 940.

Figure 10:
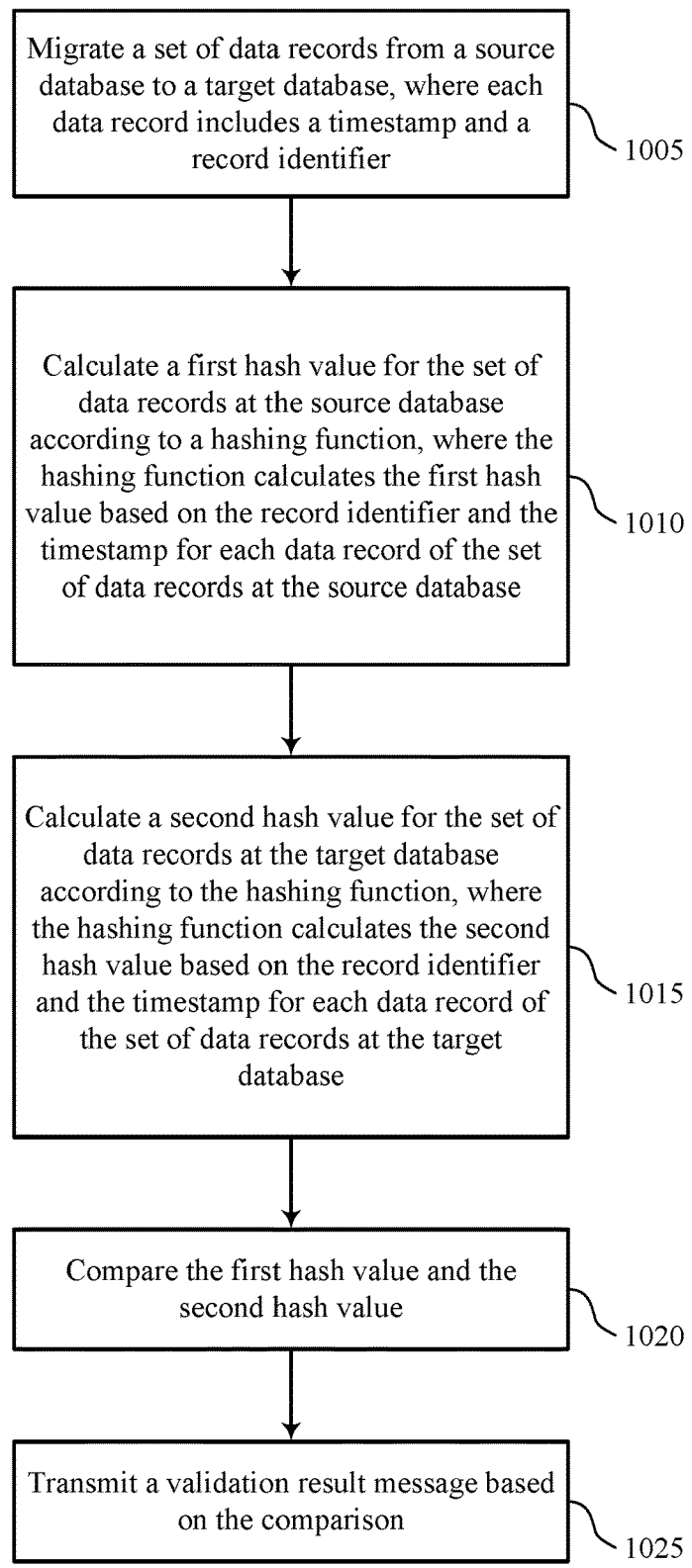
FIGS. 10 through 12 illustrate methods for efficient data validation in a migration in accordance with aspects of the present disclosure.

FIG. 10 shows a flowchart illustrating a method 1000 for data validation for data record migrations in accordance with aspects of the present disclosure. The operations of method 1000 may be implemented by a migration and validation server 205, 305, 405, 505, or 605 or its components as described herein, e.g., with reference to FIGS. 2-6. For example, the operations of method 1000 may be performed by a validation manager as described with reference to FIGS. 7 through 9. In some examples, a migration and validation server may execute a set of codes to control the functional elements of the device to perform the functions described below. Additionally or alternatively, the migration and validation server may perform aspects of the functions described below using special-purpose hardware.

At 1005 the migration and validation server may migrate a set of data records from a source database to a target database, where each data record includes a timestamp and a record identifier. The operations of 1005 may be performed according to the methods described herein. In certain examples, aspects of the operations of 1005 may be performed by a migration component as described with reference to FIGS. 7 through 9.

At 1010 the migration and validation server may calculate a first hash value for the set of data records at the source database according to a hashing function, where the hashing function calculates the first hash value based on the record identifier and the timestamp for each data record of the set of data records at the source database. The operations of 1010 may be performed according to the methods described herein. In certain examples, aspects of the operations of 1010 may be performed by a hash value component as described with reference to FIGS. 7 through 9.

At 1015 the migration and validation server may calculate a second hash value for the set of data records at the target database according to the hashing function, where the hashing function calculates the second hash value based on the record identifier and the timestamp for each data record of the set of data records at the target database. The operations of 1015 may be performed according to the methods described herein. In certain examples, aspects of the operations of 1015 may be performed by a hash value component as described with reference to FIGS. 7 through 9.

At 1020 the migration and validation server may compare the first hash value and the second hash value. The operations of 1020 may be performed according to the methods described herein. In certain examples, aspects of the operations of 1020 may be performed by a comparison component as described with reference to FIGS. 7 through 9.

At 1025 the migration and validation server may transmit a validation result message based on the comparison. The operations of 1025 may be performed according to the methods described herein. In certain examples, aspects of the operations of 1025 may be performed by a result message component as described with reference to FIGS. 7 through 9.

Figure 11:
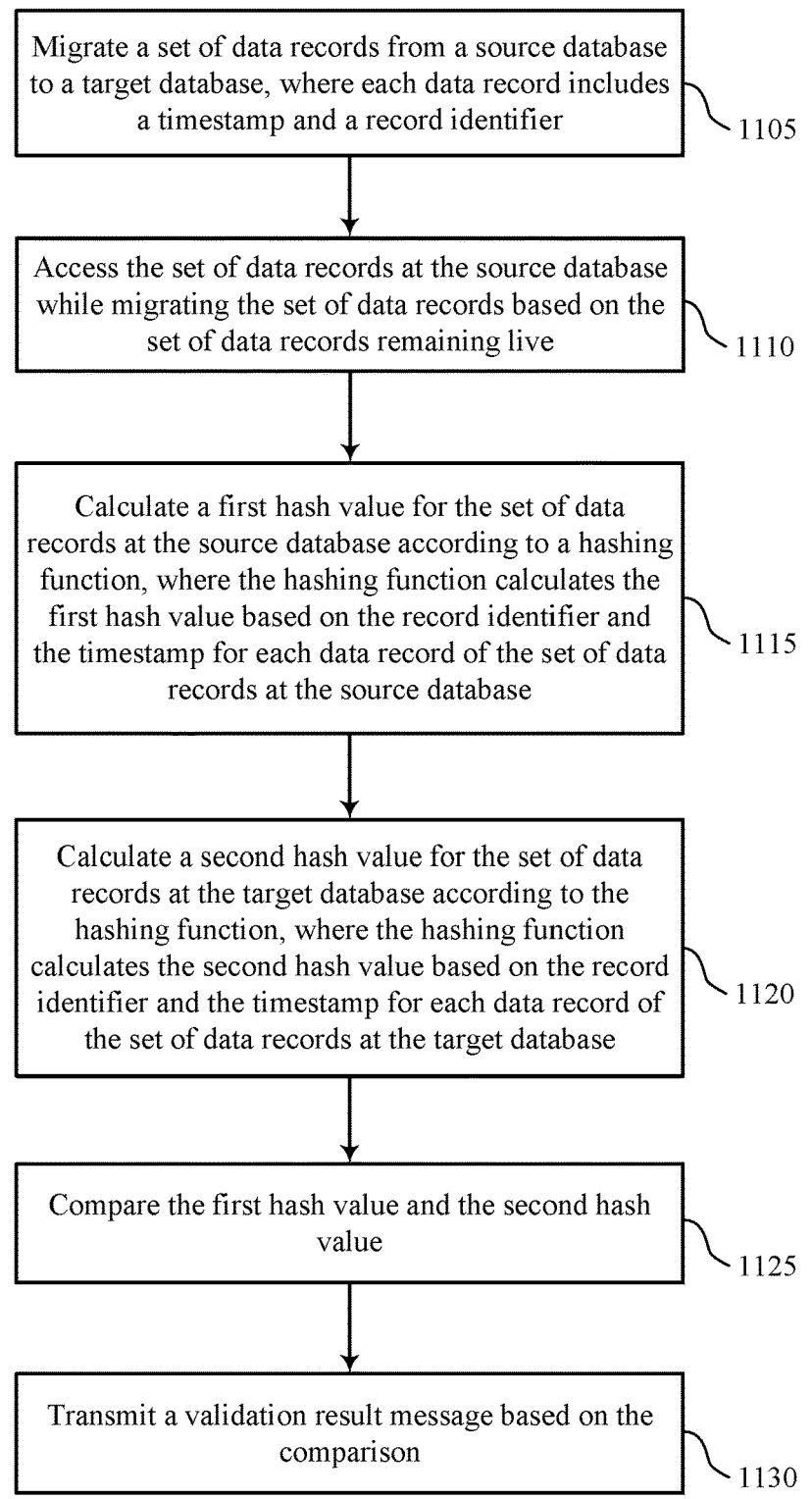

FIG. 11 shows a flowchart illustrating a method 1100 for data validation for data record migrations in accordance with aspects of the present disclosure. The operations of method 1100 may be implemented by a migration and validation server 205, 305, 405, 505, or 605 or its components as described herein, e.g., with reference to FIGS. 2-6. For example, the operations of method 1100 may be performed by a validation manager as described with reference to FIGS. 7 through 9. In some examples, a migration and validation server may execute a set of codes to control the functional elements of the device to perform the functions described below. Additionally or alternatively, the migration and validation server may perform aspects of the functions described below using special-purpose hardware.

At 1105 the migration and validation server may migrate a set of data records from a source database to a target database, where each data record includes a timestamp and a record identifier. The operations of 1105 may be performed according to the methods described herein. In certain examples, aspects of the operations of 1105 may be performed by a migration component as described with reference to FIGS. 7 through 9.

At 1110 the migration and validation server may access the set of data records at the source database while migrating the set of data records based on the set of data records remaining live. The operations of 1110 may be performed according to the methods described herein. In certain examples, aspects of the operations of 1110 may be performed by a live data component as described with reference to FIGS. 7 through 9.

At 1115 the migration and validation server may calculate a first hash value for the set of data records at the source database according to a hashing function, where the hashing function calculates the first hash value based on the record identifier and the timestamp for each data record of the set of data records at the source database. The operations of 1115 may be performed according to the methods described herein. In certain examples, aspects of the operations of 1115 may be performed by a hash value component as described with reference to FIGS. 7 through 9.

At 1120 the migration and validation server may calculate a second hash value for the set of data records at the target database according to the hashing function, where the hashing function calculates the second hash value based on the record identifier and the timestamp for each data record of the set of data records at the target database. The operations of 1120 may be performed according to the methods described herein. In certain examples, aspects of the operations of 1120 may be performed by a hash value component as described with reference to FIGS. 7 through 9.

At 1125 the migration and validation server may compare the first hash value and the second hash value. The operations of 1125 may be performed according to the methods described herein. In certain examples, aspects of the operations of 1125 may be performed by a comparison component as described with reference to FIGS. 7 through 9.

At 1130 the migration and validation server may transmit a validation result message based on the comparison. The operations of 1130 may be performed according to the methods described herein. In certain examples, aspects of the operations of 1130 may be performed by a result message component as described with reference to FIGS. 7 through 9.

In some cases, the set of data records remains live at the source database during the migration.

Figure 12:
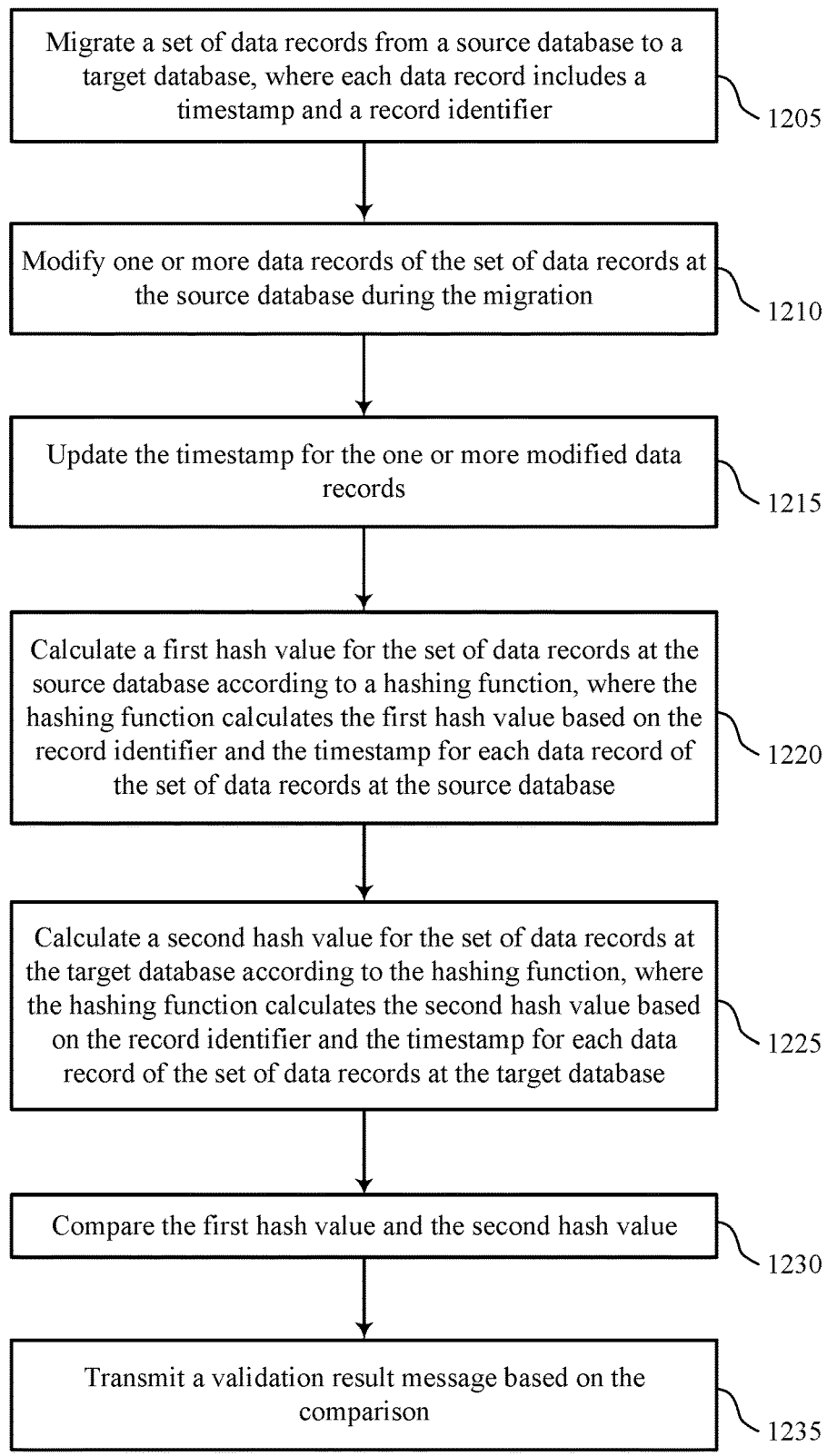

FIG. 12 shows a flowchart illustrating a method 1200 for data validation for data record migrations in accordance with aspects of the present disclosure. The operations of method 1200 may be implemented by a migration and validation server 205, 305, 405, 505, or 605 or its components as described herein, e.g., with reference to FIGS. 2-6. For example, the operations of method 1200 may be performed by a validation manager as described with reference to FIGS. 7 through 9. In some examples, a migration and validation server may execute a set of codes to control the functional elements of the device to perform the functions described below. Additionally or alternatively, the migration and validation server may perform aspects of the functions described below using special-purpose hardware.

At 1205 the migration and validation server may migrate a set of data records from a source database to a target database, where each data record includes a timestamp and a record identifier. The operations of 1205 may be performed according to the methods described herein. In certain examples, aspects of the operations of 1205 may be performed by a migration component as described with reference to FIGS. 7 through 9.

At 1210 the migration and validation server may modify one or more data records of the set of data records at the source database during the migration. The operations of 1210 may be performed according to the methods described herein. In certain examples, aspects of the operations of 1210 may be performed by a modification component as described with reference to FIGS. 7 through 9.

At 1215 the migration and validation server may update the timestamp for the one or more modified data records. The operations of 1215 may be performed according to the methods described herein. In certain examples, aspects of the operations of 1215 may be performed by a modification component as described with reference to FIGS. 7 through 9.

At 1220 the migration and validation server may calculate a first hash value for the set of data records at the source database according to a hashing function, where the hashing function calculates the first hash value based on the record identifier and the timestamp for each data record of the set of data records at the source database. The operations of 1220 may be performed according to the methods described herein. In certain examples, aspects of the operations of 1220 may be performed by a hash value component as described with reference to FIGS. 7 through 9.

At 1225 the migration and validation server may calculate a second hash value for the set of data records at the target database according to the hashing function, where the hashing function calculates the second hash value based on the record identifier and the timestamp for each data record of the set of data records at the target database. The operations of 1225 may be performed according to the methods described herein. In certain examples, aspects of the operations of 1215 may be performed by a hash value component as described with reference to FIGS. 7 through 9.

At 1230 the migration and validation server may compare the first hash value and the second hash value. The operations of 1230 may be performed according to the methods described herein. In certain examples, aspects of the operations of 1220 may be performed by a comparison component as described with reference to FIGS. 7 through 9.

At 1235 the migration and validation server may transmit a validation result message based on the comparison. The operations of 1235 may be performed according to the methods described herein. In certain examples, aspects of the operations of 1235 may be performed by a result message component as described with reference to FIGS. 7 through 9.

In some cases, the set of data records remains live at the source database during the migration.

A method of data migration validation is described. The method may include migrating a set of data records from a source database to a target database, where each data record includes a timestamp and a record identifier, calculating a first hash value for the set of data records at the source database according to a hashing function, where the hashing function calculates the first hash value based on the record identifier and the timestamp for each data record of the set of data records at the source database, calculating a second hash value for the set of data records at the target database according to the hashing function, where the hashing function calculates the second hash value based on the record identifier and the timestamp for each data record of the set of data records at the target database, comparing the first hash value and the second hash value, and transmitting a validation result message based on the comparison.

Another apparatus for data migration validation is described. The apparatus may include a processor, memory in electronic communication with the processor, and instructions stored in the memory. The instructions may be operable to cause the processor to migrate a set of data records from a source database to a target database, where each data record includes a timestamp and a record identifier, calculate a first hash value for the set of data records at the source database according to a hashing function, where the hashing function calculates the first hash value based on the record identifier and the timestamp for each data record of the set of data records at the source database, calculate a second hash value for the set of data records at the target database according to the hashing function, where the hashing function calculates the second hash value based on the record identifier and the timestamp for each data record of the set of data records at the target database, compare the first hash value and the second hash value, and transmit a validation result message based on the comparison.

A non-transitory computer-readable medium for data migration validation is described. The non-transitory computer-readable medium may include instructions operable to cause a processor to migrate a set of data records from a source database to a target database, where each data record includes a timestamp and a record identifier, calculate a first hash value for the set of data records at the source database according to a hashing function, where the hashing function calculates the first hash value based on the record identifier and the timestamp for each data record of the set of data records at the source database, calculate a second hash value for the set of data records at the target database according to the hashing function, where the hashing function calculates the second hash value based on the record identifier and the timestamp for each data record of the set of data records at the target database, compare the first hash value and the second hash value, and transmit a validation result message based on the comparison.

In some examples of the method, apparatus, and non-transitory computer-readable medium described above, comparing the first validation value and the second validation value further includes comparing a first row count for the set of data records at the source database and a second row count for the set of data records at the target database. Some examples of the method, apparatus, and non-transitory computer-readable medium described above may further include processes, features, means, or instructions for transmitting the validation result message based on the row count comparison.

In some examples of the method, apparatus, and non-transitory computer-readable medium described above, transmitting the validation result message further includes determining the first hash value and second hash value may be equal based on the comparison, where the validation result message indicates a successful migration.

In some examples of the method, apparatus, and non-transitory computer-readable medium described above, transmitting the validation result message further includes determining the first hash value and second hash value may be different based on the comparison, where the validation result message indicates an unsuccessful migration.

In some examples of the method, apparatus, and non-transitory computer-readable medium described above, the set of data records remains live at the source database during the migration.

Some examples of the method, apparatus, and non-transitory computer-readable medium described above may further include processes, features, means, or instructions for accessing the set of data records at the source database while migrating the set of data records based on the set of data records remaining live.

Some examples of the method, apparatus, and non-transitory computer-readable medium described above may further include processes, features, means, or instructions for modifying one or more data records of the set of data records at the source database during the migration. Some examples of the method, apparatus, and non-transitory computer-readable medium described above may further include processes, features, means, or instructions for updating the timestamp for the one or more modified data records.

Some examples of the method, apparatus, and non-transitory computer-readable medium described above may further include processes, features, means, or instructions for transmitting the one or more modified data records to the target database during a dead phase, where the dead phase includes a period where the set of data records may be locked down.

Some examples of the method, apparatus, and non-transitory computer-readable medium described above may further include processes, features, means, or instructions for calculating an additional hash value for the set of data records at the source database according to the hashing function, where the hashing function calculates the additional hash value based on the record identifier and the updated timestamp for each data record of the set of data records at the source database. Some examples of the method, apparatus, and non-transitory computer-readable medium described above may further include processes, features, means, or instructions for comparing the additional hash value and the second hash value. Some examples of the method, apparatus, and non-transitory computer-readable medium described above may further include processes, features, means, or instructions for transmitting the validation result message based on the comparison of the additional hash value and the second hash value.

In some examples of the method, apparatus, and non-transitory computer-readable medium described above, transmitting the validation result message further includes determining the additional hash value and second hash value may be equal based on the comparison, where the validation result message indicates a successful migration.

In some examples of the method, apparatus, and non-transitory computer-readable medium described above, transmitting the validation result message further includes determining the additional hash value and second hash value may be different based on the comparison, where the validation result message indicates an unsuccessful migration.

In some examples of the method, apparatus, and non-transitory computer-readable medium described above, the record identifier for each data record includes a primary key or an alternate key.

In some examples of the method, apparatus, and non-transitory computer-readable medium described above, the set of data records includes one or more tables of data records.

Some examples of the method, apparatus, and non-transitory computer-readable medium described above may further include processes, features, means, or instructions for migrating a subset of the one or more tables of data records.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data migration validation, comprising:
   migrating a set of data records from a source database to a target database, wherein the set of data records remain live at the source database during the migration, and each data record of the set of data records comprises a timestamp and a record identifier;
   receiving, during the migration, a modification to a data record of the set of data records;
   updating, at the source database, a first timestamp corresponding to a time of the modification to the data record;
   calculating, according to a hashing function, a first hash value that identifies the set of data records at the source database, wherein the first hash value uniquely identifies at least the first timestamp indicating the time when the data record was last modified at the source database;
   calculating, according to the hashing function, a second hash value that identifies the set of data records at the target database, wherein the second hash value uniquely identifies at least a second timestamp indicating when the data record of the set of data records was last modified at the source database and prior to migration to the target database, the second hash value being different from the first hash value;
   comparing the first hash value and the second hash value, and performing a row count for the source database and the target database using a single instance;
   modifying one or more data records of the set of data records at the source database during the migration; updating the timestamp for the one or more modified data records; calculating an additional hash value for the set of data records according to the hashing function, and based at least in part on the record identifier and the updated timestamp for each data record of the set of data records; comparing the additional hash value and the second hash value; and transmitting a validation result message indicating that the data migration was unsuccessful based at least in part on comparing the additional hash value and the second hash value.

2. The method of claim 1, wherein comparing the first validation value and the second validation value further comprises:
   comparing a first row count for the set of data records at the source database and a second row count for the set of data records at the target database; and
   transmitting the validation result message based at least in part on comparing the first row count and the second row count.

3. The method of claim 1, further comprising:
   determining the first hash value and a third hash value calculated at the target database are equal based at least in part on comparing the first hash value and the third hash value, wherein a second validation result message associated with the third hash value indicates a successful migration.

4. The method of claim 1, further comprising:
   accessing the set of data records at the source database while migrating the set of data records based at least in part on the set of data records remaining live.

5. The method of claim 1, further comprising:
   transmitting the one or more modified data records to the target database during a dead phase, wherein the dead phase comprises a period where the set of data records are locked down at the source database.

6. The method of claim 1, wherein transmitting the validation result message further comprises: determining the additional hash value and second hash value are equal based at least in part on the comparing, wherein the validation result message indicates a successful migration.

7. The method of claim 1, wherein transmitting the validation result message further comprises: determining the additional hash value and second hash value are different based at least in part on the comparing, wherein the validation result message indicates an unsuccessful migration.

8. The method of claim 1, wherein the record identifier for each data record comprises a primary key or an alternate key.

9. The method of claim 1, wherein the set of data records comprises one or more tables of data records.

10. The method of claim 9, further comprising:
    migrating a subset of the one or more tables of data records.

11. An apparatus for data migration validation, comprising:
    a processor;
    memory in electronic communication with the processor; and
    instructions stored in the memory and executable by the processor to cause the apparatus to:
    migrate a set of data records from a source database to a target database, wherein the set of data records remain live at the source database during the migration, and each data record of the set of data records comprises a timestamp and a record identifier;
    receive, during the migration, a modification to a data record of the set of data records;
    update, at the source database, a first timestamp corresponding to a time of the modification to the data record;
    calculate, according to a hashing function, a first hash value that identifies the set of data records at the source database, wherein the first hash value uniquely identifies at least the first timestamp indicating the time when the data record was last modified at the source database;
    calculate, according to the hashing function, a second hash value that identifies the set of data records at the target database, wherein the second hash value uniquely identifies at least a second timestamp indicating when the data record of the set of data records was last modified at the source database and prior to migration to the target database, the second hash value being different from the first hash value;
    compare the first hash value and the second hash value, and perform a row count for the source database and the target database using a single instance; modify one or more data records of the set of data records at the source database during the migration; update the timestamp for the one or more modified data records;

calculate an additional hash value for the set of data records according to the hashing function, and based at least in part on the record identifier and the updated timestamp for each data record of the set of data records; compare the additional hash value and the second hash value; and transmit a validation result message indicating that the data migration was unsuccessful based at least in part on comparing the additional hash value and the second hash value.

12. The apparatus of claim 11, wherein the instructions to transmit the validation result message further are executable by the processor to cause the apparatus to:

determine the first hash value and second hash value are equal based at least in part on the comparing, wherein the validation result message indicates a successful migration.

13. The apparatus of claim 11, wherein the instructions are further executable by the processor to cause the apparatus to:

determine the first hash value and a third hash value calculated at the target database are different based at least in part on comparing the first hash value and the third hash value, wherein a second validation result message associated with the third hash value indicates a successful migration.

14. A non-transitory computer-readable medium storing code for data migration validation, the code comprising instructions executable by a processor to:

migrate a set of data records from a source database to a target database, wherein the set of data records remain live at the source database during the migration, and each data record of the set of data records comprises a timestamp and a record identifier;

receive, during the migration, a modification to a data record of the set of data records;

update, at the source database, a first timestamp corresponding to a time of the modification to the data record;

calculate, according to a hashing function, a first hash value that identifies the set of data records at the source database, wherein outputs the first hash value uniquely identifies at least the first timestamp indicating the time when the data record was last modified at the source database;

calculate, according to the hashing function, a second hash value that identifies the set of data records at the target database, wherein the second hash value uniquely identifies at least a second timestamp indicating when the data record of the set of data records was last modified at the source database and prior to migration to the target database, the second hash value being different from the first hash value;

compare the first hash value and the second hash value, and perform a row count for the source database and the target database using a single instance; modify one or more data records of the set of data records at the source database during the migration; update the timestamp for the one or more modified data records; calculate an additional hash value for the set of data records according to the hashing function, and based at least in part on the record identifier and the updated timestamp for each data record of the set of data records; compare the additional hash value and the second hash value; and transmit a validation result message indicating that the data migration was unsuccessful based at least in part on comparing the additional hash value and the second hash value.

* * * * *